United States Patent Office.

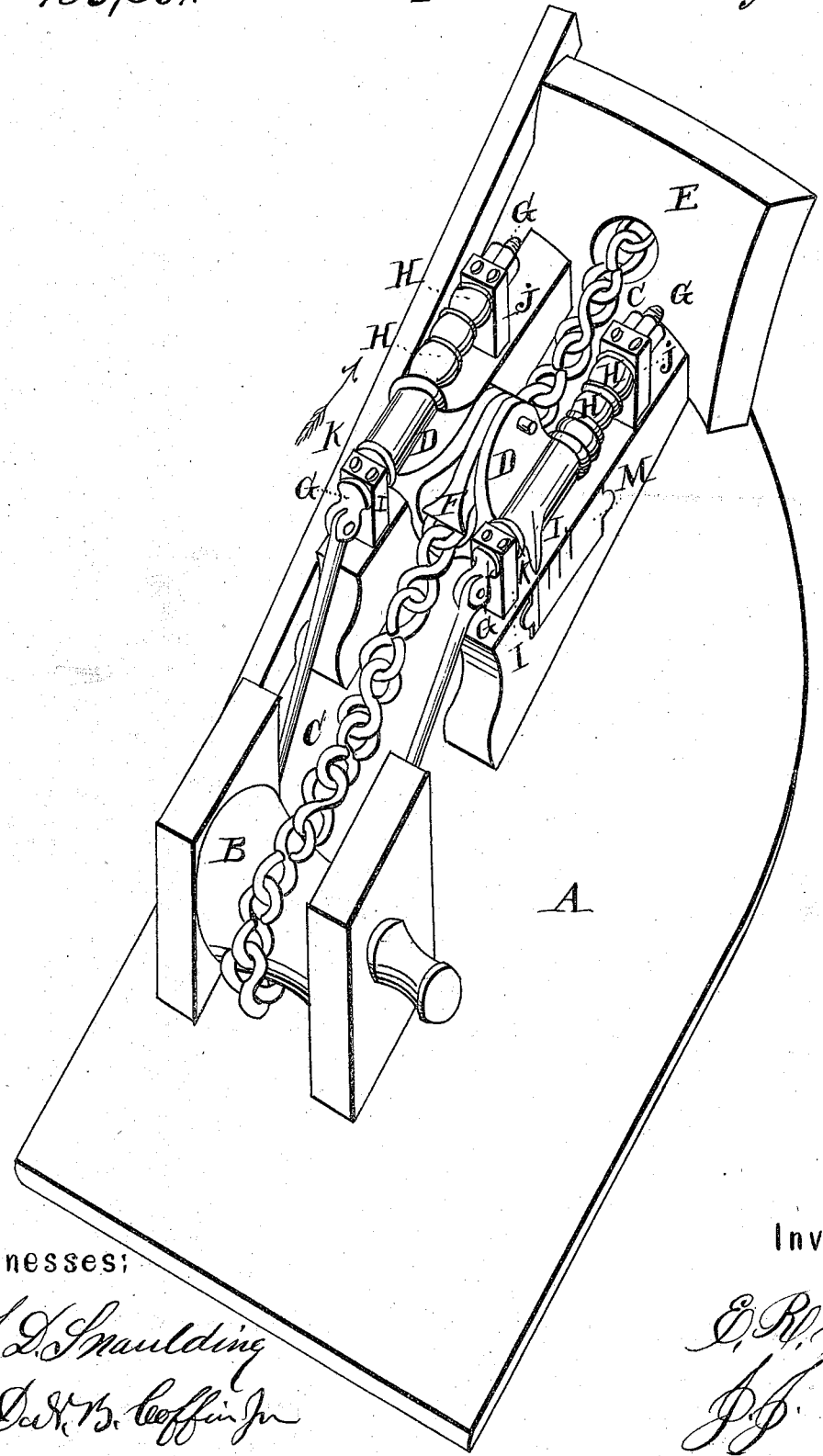

ETHAN R. CHENEY, OF BOSTON, MASSACHUSETTS, AND JOHN J. EMERY OF OWL'S HEAD, MAINE.

Letters Patent No. 106,031, dated August 2, 1870.

IMPROVEMENT IN CABLE-STOPPERS.

The Schedule referred to in these Letters Patent and making part of the same.

We, ETHAN R. CHENEY, of Boston, in the county of Suffolk and State of Massachusetts, and JOHN J. EMERY, of Owl's Head, in the county of Knox and State of Maine, have invented an Improved Strain-indicating Connection, Stopper, or Holder for Vessel's Cables, of which the following is a specification.

Nature and Objects of the Invention.

This invention relates to the construction of the chain-stopper, holder, or other connection between vessels and their anchor-chain or cable, in such manner as not only to afford elasticity of action in such a connection, but so, also, as to furnish in such connecting device and its appurtenances an indicator, which which will always, in cases of severe strain, indicate with comparative, if not absolute, accuracy, the amount of strain to which the cable is subjected.

Description of Drawing.

The accompanying drawing illustrates my invention by a perspective view of a portion of a vessel, the cable, and the elastic indicating connection.

General Description.

The vessel's deck appears at A, the windlass at B, the cable at C.

The cable passes from the windlass through the movable part of the connection D, on its passage from the windlass to the hawse-pipe E.

A pawl, F, gripes and holds the chain C to the movable part or pipe D, and is furnished with an eye or other means, by which it may be lifted when it is desired to release the cable.

The movable part D is guided by suitable rods G G, or other sufficient guides, and is limited and controlled in its movement in the direction indicated by the arrow, by means of suitable springs, H, and these are confined by the standards J.

In the opposite direction the motion of part D is limited, and the shock of its suddenly stopping against standards I is modified by means of an elastic cushion, K.

The movable part D is provided with a pointer or index, L, and upon an adjacent fixed support is arranged a graduated plate or scale, M.

The scale and pointer may, however, be reversed or transposed in their order of arrangement, when preferred.

The operation of the device may be thus described:

Previous to use, a severe strain is applied to the chain C, arranged in part D F, as shown, by means of a hydraulic press, or other means, with suitable facilities for weighing the strain all the way along as it is commenced, and increased up to the maximum.

The graduations are then made upon the index-plate M, and properly numbered, according to the number of pounds or tons of strain, successively applied, until the full intended working capacity of the cable is included in the scale.

When the pressure or strain is relieved, the part D F immediately recedes to the normal position, as shown in the drawing, by the recoil action of the springs H.

When a vessel is riding at anchor by the cable C, connected by the improved indicating elastic stopper or connection, the part D F will move backward and forward, as the strain upon the cable is less or more, and the amount of strain upon the cable is thereby indicated by the pointer L upon the scale or index-plate M.

As the strain upon the cable increases, the springs H are compressed, and, as it decreases, the springs H recoil and force the part D F back toward and against the standards I; therefore the elastic cushions K are interposed, and serve to prevent injury from the meeting of part D and the standard I.

Claim.

We claim—

The index and pointer L M, in combination with the traversing stopper or holder D F, and springs H, and also the arrangement of these parts, substantially as described.

ETHAN R. CHENEY.
JOHN J. EMERY.

Witnesses:
J. D. SPAULDING,
D. N. B. COFFIN, Jr.